United States Patent [19]

Schmidhuber

[11] 4,099,780

[45] Jul. 11, 1978

[54] AIRLINE PASSENGER SEAT

[75] Inventor: Karl Schmidhuber, Nurtingen-Robdorf, Germany

[73] Assignee: Recaro GmbH & Co., Kirchheim, Teck, Germany

[21] Appl. No.: 693,152

[22] Filed: Jun. 7, 1976

[30] Foreign Application Priority Data

Jun. 5, 1975 [DE] Fed. Rep. of Germany ... 7517891[U]

[51] Int. Cl.² .............................................. A47C 7/54
[52] U.S. Cl. .................................... 297/411; 297/232
[58] Field of Search ................... 244/122 R; 297/194, 297/232, 248, 411, 412, 416, 417, 419–422, 445, 450, 455

[56] References Cited

U.S. PATENT DOCUMENTS

| 826,670 | 8/1906 | Kline | 297/422 |
|---|---|---|---|
| 2,833,339 | 5/1958 | Liljengren | 297/455 X |
| 2,914,119 | 11/1959 | Keefe | 297/412 |
| 3,374,032 | 3/1968 | Giudice | 297/417 X |

Primary Examiner—James C. Mitchell
Attorney, Agent, or Firm—Wigman & Cohen

[57] ABSTRACT

An airline passenger seat is disclosed wherein a seat divider is provided with a lightweight, high strength filler which may be formed of hard foam plastic. The filler is secured to the seat divider on the free end of a row of airline passenger seats for providing a treadboard support and is capable of absorbing high stresses and transmitting them to the seat divider.

10 Claims, 4 Drawing Figures

AIRLINE PASSENGER SEAT

BACKGROUND OF THE INVENTION

This invention relates to an airline passenger seat with at least one seat divider that has a plastic filler supporting a casing.

In known seats of this type, the purpose of the filler is simply to fill the spaces between the bracing ribs of the seat divider and the hollow spaces formed by the openings of these ribs, so that there is a bearing surface for the casing that corresponds to the desired form of said casing. Thus, the filler need not have a mechanical stress capacity, especially as the casing is attached to the seat divider and for this reason the filler is made of a part with correspondingly low stress capacity.

SUMMARY AND OBJECTS OF THE INVENTION

It is an object of this invention to provide an airline passenger seat in which the space between the seat divider and the casing is used more advantageously than in the case of known airline passenger seats. This problem is solved by an airline passenger seat of the type mentioned above in that the filler is designed as a piece of hard foam plastic which absorbs stresses in an inherently stable manner and transmits them to the seat divider, and which is firmly attached to the seat divider.

Such a filler is capable, not only of absorbing a portion of the stresses that must be absorbed by the seat divider alone in the case of known airline passenger seats, but also makes it possible to select such a form for the seat divider as can be installed either between the two seats or on the free end of one seat. Furthermore, such filler simplifies the attachment of the casing, since the casing can be attached to the filler itself.

In order to achieve a favorable strength to weight ratio, the filler is preferably equipped with bracing ribs.

In the case of a preferred embodiment, the filler has a bearing surface for an arm rest that can be hinged to the seat divider. Then, as needed, the seat divider may be combined with an arm rest, thus requiring no modification in the seat divider. The filler bearing surface may be provided with at least one boring so that the arm rest can be screwed onto the filler. In order to ensure that the filler, despite its relatively low weight, can absorb the sometimes heavy load transmitted to it by an arm rest, the filler preferably projects upward or forward beyond the seat divider in increasing measure from the end corresponding to the front edge of the seat to the upward end. The load transmitted by the arm rest can then be reliably absorbed, even if the bearing surface for the arm rest consists entirely of the part of the filler that projects from the upper end forward beyond the seat divider.

In another preferred embodiment, the filler has a bearing surface for a treadboard plating near the end corresponding to the front edge of the seat. Because of the relatively high strength of the filler, it is possible to make the treadboard, which as a rule must be on the seat directly on the aisle, from the filler. Thus, construction is markedly simplified in that the treadboard need not be provided directly on the seat divider.

BRIEF DESCRIPTION OF THE DRAWINGS

In the following, the invention is explained in detail with reference to the embodiment illustrated in the drawings, wherein.

DETAILED DESCRIPTION OF A PREFERRED EMBODIMENT

Figure 1:
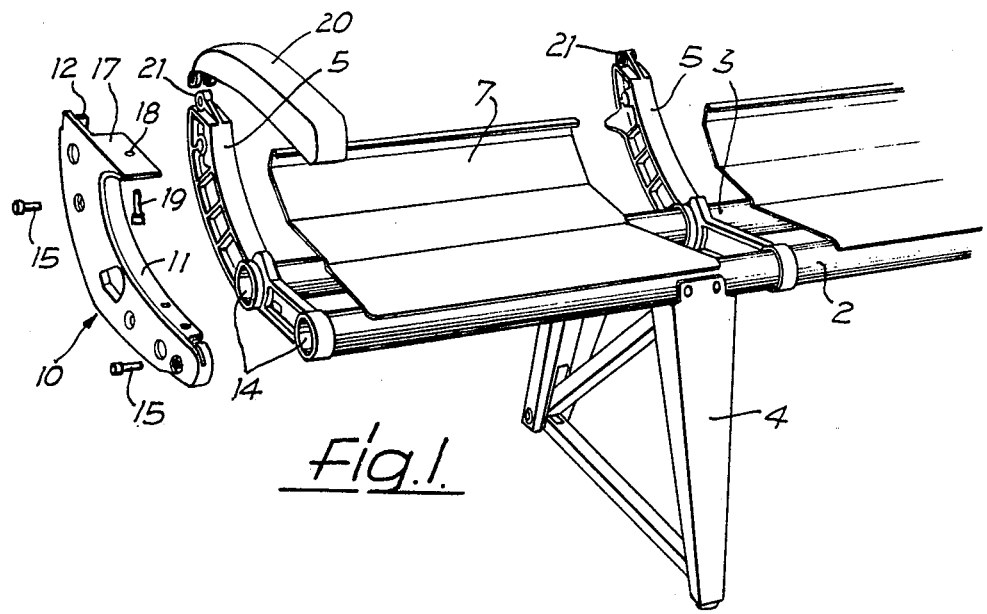
FIG. 1 shows a perspective view of the seat framework of an airline passenger seat, with the exception of the seat back.
Figure 4:
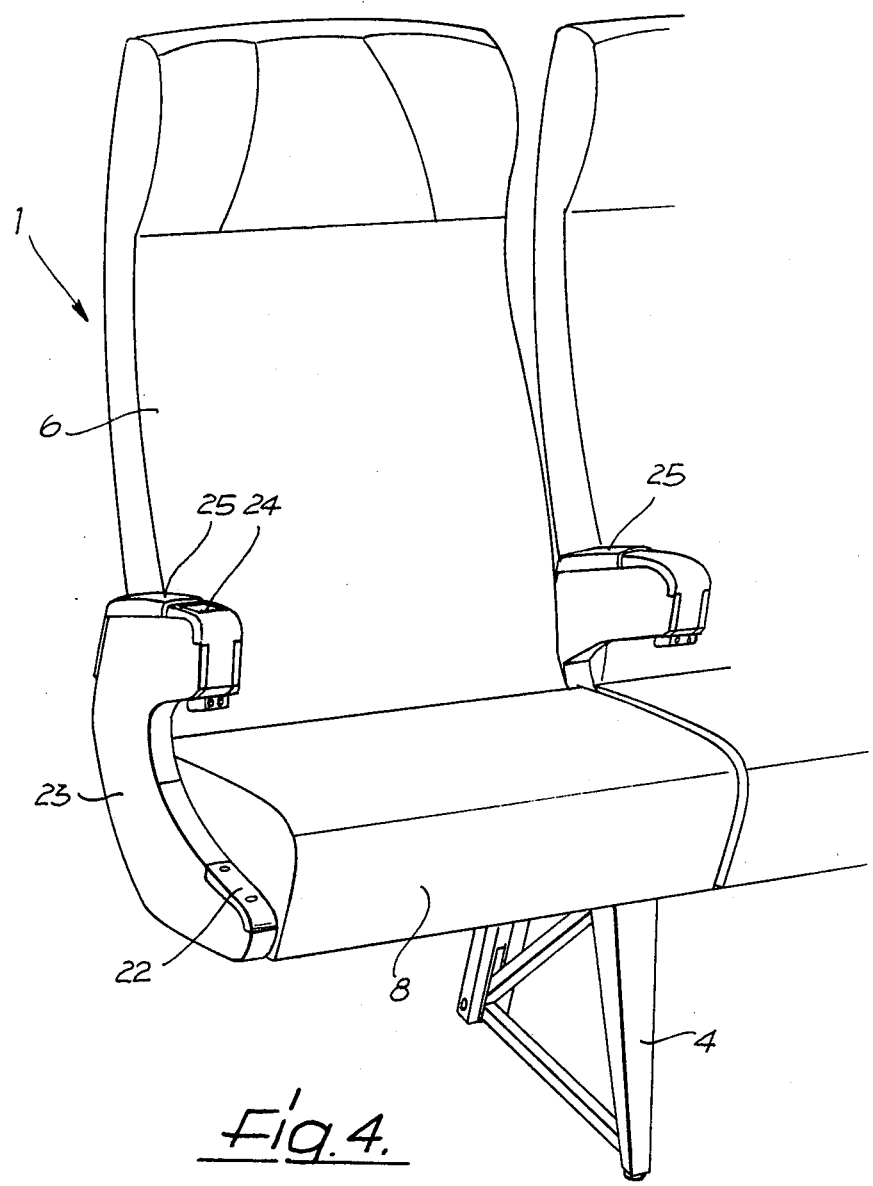
FIG. 4 shows a perspective view of an airline passenger seat with an arm rest on each side.

The seat framework shown in FIG. 1 of an airline passenger seat which is designated generally by the reference numeral 1 in FIG. 4, has two parallel and separately placed pipes 2 and 3, which form its crossbeams, and which are supported on feet 4, only one of which is shown. When two or three seats are arranged adjacent to one another, only 2 feet are provided for weight reasons. The pipes 2 and 3 are therefore supported by a foot only on the ends adjacent another seat, but not on the free end thereof. The two pipes 2 and 3 which extend along the entire row of seats, are connected by means of identical seat dividers 5 at their free ends and at the side adjacent to the next seat, that is, between the seats.

The seat divider 5 is formed of metal and is an elongated support, reinforced by ribs, which has an upwardly-bent segment connected to the portion extending between the pipes 2 and 3. To this upwardly-bent segment, the seat back 6 (FIG. 4) is attached.

A plate 7 rests on the pipes 2 and 3, which plate may be connected with the two seat dividers 5, and serves as a support for a seat cushion 8 (FIG. 4) that projects beyond the front pipe 2 and conceals it from the front.

Figure 2:
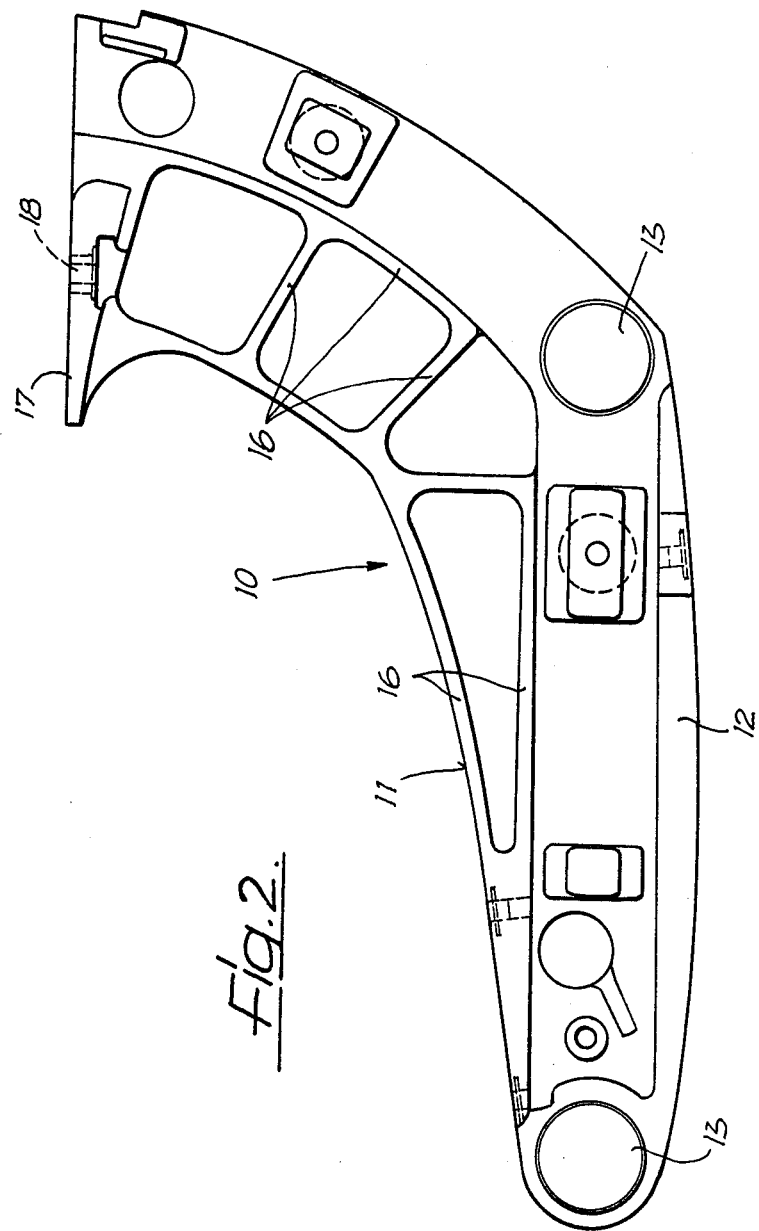
FIG. 2 shows a side view of the filler of the invention.

The seat divider 5, shown on the left in FIGS. 1 and 4, has a filler 10 consisting of a hard polyurethane foam and, like the seat divider 5, absorbs loads in an inherently stable manner. The filler 10, like the seat divider 5, is an elongated support and is reinforced by ribs. As FIG. 1 shows, it is placed on the side of the seat divider 5 facing outward, whereby it overlaps both the topside and the underside of the seat divider with raised edges 11 and 12. The height of the edge 11 is equal to the width of the seat divider 5, so that the latter is concealed by this edge. Projecting, conical parts 13 (FIG. 2) on the side facing the seat divider 5 fit into the borings 14 of the seat divider, which also serves to retain the pipes 2 and 3, and form a form-locking connection with the seat divider. In addition, there are also several connecting screws 15 that penetrate through the filler 10 and the seat divider 5, in order to connect the two parts firmly together.

As FIG. 1 shows, the width of the filler 10 at its front end, measured from the bottom to the top, is approximately equal to the width of the seat divider 5. Toward the other, upward-pointing end, the width of the filler 10 increases beyond that of the seat divider 5, as can also be seen from FIG. 2. The part of the filler 10 with the bracing ribs is that part that projects beyond the seat divider 5. The upper end of this projecting part is provided with a plate 17 that projects forwardly and is supported by a bracing rib in this forward-projecting area. The upper surface of the plate 7 forms an even bearing surface that extends from the free front edge of the plate 17 to the seat divider 5 and is, therefore, relatively long in the length-wise direction of the seat. A boring 18 pierces the plate 17 and serves to receive a screw 19.

The underside of an arm rest 20 is placed on the plate 17; the back end of this arm rest is hinged with an eye 21 formed in the upper end of the seat divider 5. Because the filler 10 is designed as a stiff, load-absorbing part, it can safely absorb the load placed on the arm rest 20. Insofar as, in the illustrated embodiment, the arm rest 20 does not swivel, it is connected to the filler 10 by means of the screw 19.

Figure 3:
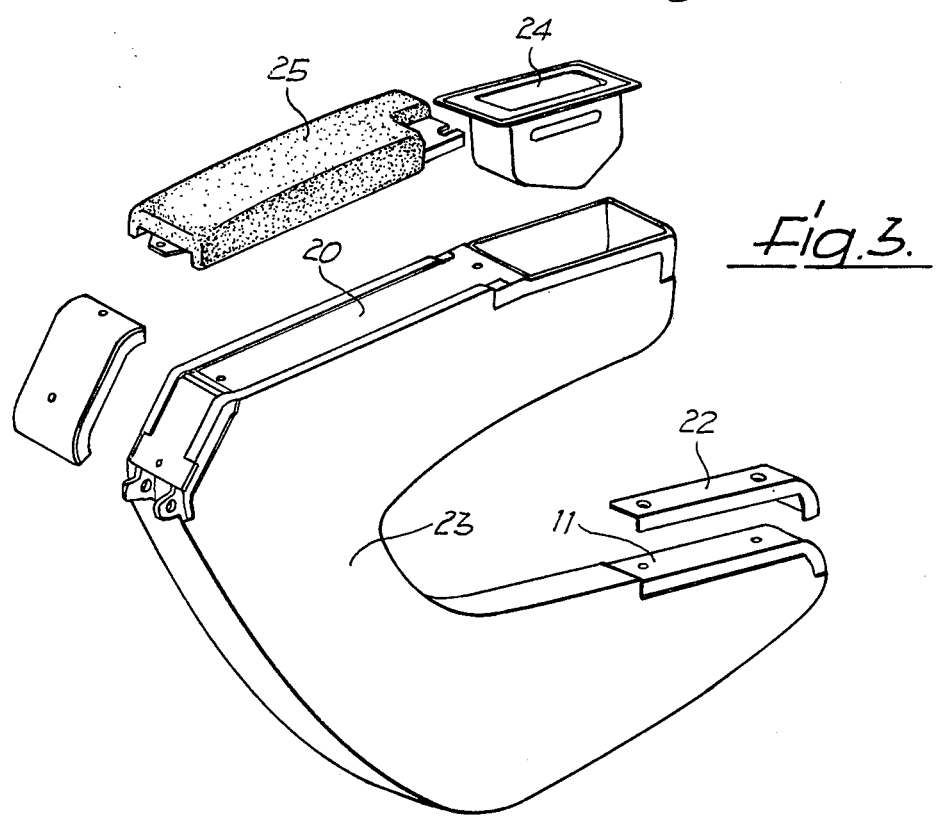
FIG. 3 shows a perspective and partly exploded view of a seat divider equipped with an arm rest.

The edge 11 of the filler 10, near the front end thereof, forms a bearing surface for a treadboard plating 22 which, as FIG. 3 shows, is placed on the upper surface of the edge 11 and attached by screws to the filler 10. The strength of the filler 10 is sufficiently great to absorb and transmit to the seat divider 5 any forces that arise when a person steps on the treadboard plating 22.

The side of the filler 10 facing outward is even and smooth and serves as a bearing surface for a casing 23 which, as shown in FIGS. 3 and 4, covers both the filler 10 and the sides of the arm rest 20. In addition, the upper side of the filler 10, and thus also the seat divider 5, as well as the underside of the arm rest, are covered by the casing 23. The front end of the arm rest has an ashtray 24 that masks the arm rest in this area. Behind the ashtray, the arm rest 20 is covered with a cushion 25.

Although only a preferred embodiment is specifically illustrated and described herein, it will be appreciated that many modifications and variations of the present invention are possible in light of the above teachings and within the purview of the appended claims without departing from the spirit and intended scope of the invention.

What is claimed is:

1. In an airline passenger seat having at least one seat divider, the improvement comprising a filler member affixed to said seat divider, said filler member being formed of hard foam plastic for absorbing loads and stresses in an inherently stable manner and transmitting such loads and stresses to the seat divider and a casing supported by said filler member.

2. The improvement according to claim 1, wherein said filler member is reinforced with ribs and extends along the entire length of the seat divider.

3. The improvement according to claim 1, wherein said filler member is provided with a bearing plate and including an arm rest connected to the seat divider, said arm rest being supported on the bearing plate of the filler member.

4. The improvement according to claim 3, wherein said plate is provided with at least one boring and including a screw for connecting an arm rest with the filler member through such boring.

5. The improvement according to claim 3, wherein the filler member projects upward and forward beyond the seat divider in increasing width from the end thereof corresponding to the front edge of the seat to the upward end, the bearing plate for the arm rest being formed by the upwardly projecting end portion of the filler member.

6. The improvement according to claim 1, wherein the filler member is provided with a bearing surface arranged adjacent the end thereof corresponding to the front edge of the seat and including a treadboard plate secured to the bearing surface.

7. The improvement according to claim 1, wherein the filler member is provided with side bearing surfaces for said casing and including means for securing said casing to said filler member.

8. A passenger seat especially for use in airlines or the like comprising:
    (a) a seating portion including at least an upstanding seat divider affixed to said seating portion at one end thereof;
    (b) a filler member removably secured to said seat divider for transmitting loads and stress imposed thereon by a passenger to said seat divider without deforming, said filler member being formed of a relatively stiff plastic material and further including an upper portion which projects forwardly for supporting an arm rest thereon.

9. The passenger seat according to claim 8 further including an arm rest removably attached to the projecting portion of said filler intermediate the ends of said arm rest, said arm rest further including pivoting means secured at one end to seat divider, said filler including a planar bearing surface projecting forwardly for directly supporting said arm rest.

10. The passenger seat according to claim 8, wherein said filler further includes means in the lower portion for removable attachment to said seat divider, said removable attachment means including a projecting conical member adapted to fit into a corresponding opening formed in said seat divider; said filler member further including a lower portion having a generally planar section for receiving a treadboard plating, said filler member being formed of a polyurethane material.

* * * * *